US007322751B2

(12) United States Patent
Hurt

(10) Patent No.: US 7,322,751 B2
(45) Date of Patent: Jan. 29, 2008

(54) APPARATUS AND METHOD FOR ORIENTING AN OPTICAL WAVEGUIDE IN RELATION TO AN OPTICAL UNIT OF AN OPTICAL MODULE

(75) Inventor: Hans Hurt, Regensburg (DE)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 138 days.

(21) Appl. No.: 11/071,376

(22) Filed: Mar. 3, 2005

(65) Prior Publication Data

US 2005/0220417 A1 Oct. 6, 2005

(30) Foreign Application Priority Data

Mar. 4, 2004 (EP) .................................. 04090085

(51) Int. Cl.
*G02B 6/38* (2006.01)

(52) U.S. Cl. ............................ 385/67; 385/55; 385/72; 385/90; 385/62

(58) Field of Classification Search ................ 356/153, 356/138; 385/67, 68, 88, 90, 52, 60, 62, 385/25, 55
See application file for complete search history.

(56) References Cited

U.S. PATENT DOCUMENTS 5,812,258 A * 9/1998 Pierson ....................... 356/153
6,470,120 B2 10/2002 Green et al.
6,742,936 B1 * 6/2004 Knecht et al. ................ 385/67
6,874,952 B2 * 4/2005 Nishimura ................... 385/89
6,935,791 B2 * 8/2005 Ban et al. ..................... 385/90
2002/0131728 A1 9/2002 Kovalchick

FOREIGN PATENT DOCUMENTS

| | | | |
|---|---|---|---|
| CH | 630 468 | A5 | 6/1982 |
| DE | 23 58 785 | A1 | 6/1975 |
| DE | 199 09 242 | A1 | 8/2000 |
| WO | WO 03/016969 | A1 | 2/2003 |

* cited by examiner

*Primary Examiner*—Brian Healy
*Assistant Examiner*—Guy G Anderson
(74) *Attorney, Agent, or Firm*—Daniel J. Santos

(57) ABSTRACT

The invention relates to an apparatus and method for orienting an optical waveguide in relation to an optical unit arranged in or on an optical module. The optical module has a reference geometry which defines a first axis of symmetry. An offset between the optical axis of the optical unit and the axis of symmetry of the reference geometry is determined. A coupling element such as a sleeve is provided that serves to receive an optical waveguide that is to be oriented in relation to the optical unit. The sleeve has a hole defined by an internal contour thereof that defines a second axis of symmetry. The coupling element is arranged in relation to the optical module in such a way that the second axis of symmetry coincides with the optical axis of the optical unit.

17 Claims, 4 Drawing Sheets

10,20
31
1
2
3

3
10,20,40
1
2
43
4

10,420
42
1
20,410
2
41
43
4

100
15
4
1
150,410
42
10,420
11
13
43
41
110
14
12

APPARATUS AND METHOD FOR ORIENTING AN OPTICAL WAVEGUIDE IN RELATION TO AN OPTICAL UNIT OF AN OPTICAL MODULE

REFERENCE TO RELATED APPLICATION

This application claims the benefit of the priority date of European patent application 04 090 085.4, filed on Mar. 4, 2004, the contents of which is herein incorporated by reference in its entirety.

FIELD OF THE INVENTION

The invention relates to an apparatus and method for orienting an optical waveguide in relation to an optical unit of an optical module.

BACKGROUND OF THE INVENTION

The problem generally arises of coupling an optical unit such as a vertically emitting laser or a photodiode to an optical waveguide in an effective manner. For this purpose, it is known to carry out an active alignment of the optical waveguide in relation to the optical unit. For this purpose, the optical waveguide is oriented to a maximum coupled-in or coupled-out power during operation of the optical unit and is fixed in this position. However, this active alignment process is very time- and cost-intensive and is accordingly not suitable for high-volume use.

DE 199 09 242 A1 discloses an optoelectronic module in which a leadframe with an optoelectronic transducer is positioned in a module housing and potted with a light-transmissive, moldable material. Light is coupled in or out via an optical fiber coupled to a connector of the module housing. The driver chip or reception chip for the optoelectronic transducer is also situated on the leadframe.

U.S. Pat. No. 6,470,120 B2 describes a method and a device in which both an optical component and an assigned optical waveguide are in each case arranged on an inner sleeve formed eccentrically in relation to an outer sleeve arranged fixedly in an outer frame. In this case, the inner sleeve is in each case arranged in rotatable fashion in a corresponding hole of the outer sleeve. Furthermore, the optical component and the optical waveguide are in each case arranged eccentrically in the inner sleeve. By rotating the outer and/or inner sleeve, the position of the optical component and of the optical waveguide can be set in each case and these can be positioned by suitable rotation of the respective inner and outer sleeves with respect to one another.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The present invention is directed to an optical module, a constructional kit and a method which enable an optical waveguide to be oriented in relation to an optical unit in a simple and cost-effective manner without the need for active alignment.

Accordingly, the optical module has a reference geometry which defines a first access of symmetry. Firstly, an offset between the optical axis of the optical unit and the axis of symmetry of the reference geometry is determined. A coupling element is furthermore provided, which serves to receive an optical waveguide that is to be oriented in relation to the optical unit. The optical waveguide has, for this orientation purpose, a hole delimited by an internal area that defines a second axis of symmetry. The coupling element is arranged in relation to the optical module in such a way that the second axis of symmetry coincides with the optical axis of the optical unit. In addition, the first axis of symmetry and the second axis of symmetry run parallel to one another and have an offset with respect to one another which is essentially equal to the offset between the optical axis of the optical unit and the first axis of symmetry of the reference geometry.

The solution according to one embodiment of the invention is based on the concept of determining the offset between the ideal position of an optical unit in relation to the optical module and the actual position and using a coupling element for compensation of this offset. In the ideal position of the optical unit, the optical axis of the optical unit lies on the axis of symmetry of a reference geometry of the optical module. The reference geometry is a connector, for example, which operates to receive the coupling element.

In practice, on account of tolerances, the optical unit is generally not fitted on the optical module in the ideal position in which the optical axis matches the axis of symmetry of the reference geometry. Rather, an offset is present. The solution according to one embodiment of the invention envisages providing a coupling element having a cutout and fixing the coupling unit in relation to the optical unit on the module in such a way that the axis of symmetry of the cutout coincides with the optical axis of the optical unit. In this case, the axis of symmetry of the cutout is displaced by the established offset relative to the axis of symmetry (that is to say the mechanical axis) of the reference geometry.

In this exemplary case, the coupling element preferably has an external area with a further axis of symmetry, which coincides with the axis of symmetry of the reference geometry. In other words, the cutout is thus formed in an eccentric manner in the coupling element, the degree of eccentricity being chosen in such a way as to compensate for the offset between the optical axis of the optical unit and the axis of symmetry of the reference geometry.

In one embodiment of the invention, the coupling element comprises an elongate sleeve with an eccentric hole. The sleeve has two axes of symmetry. One axis of symmetry is defined by the axis of symmetry of the external contour or external area of the sleeve and the other axis of symmetry is defined by the axis of symmetry of the internal contour or internal area. After establishing the offset between the optical axis of the optical unit and the axis of symmetry of the reference geometry, a sleeve is fixed to the optical module with a configuration in which the distance between the two axes of symmetry of the sleeve corresponds to the offset between the optical axis of the optical unit and the axis of symmetry of the reference geometry.

In another embodiment, the invention also relates to a constructional kit having an optical module, which has an optical unit and a reference geometry, and also has a plurality of coupling elements. Each coupling element of the constructional kit has an internal area that defines a second axis of symmetry and an external area that defines a third axis of symmetry, wherein the offset between the second and third axes of symmetry have different magnitudes in the case of the individual coupling elements of the constructional kit. In one example, the coupling elements are in each case formed as a sleeve having a symmetrical external contour defining the third axis of symmetry, and having a hole that is eccentric with respect thereto that defines the second axis of symmetry.

After establishing an offset between the optical axis of the optical unit and the axis of symmetry of the reference geometry, the coupling element is then connected to the optical module in the case of which the offset of the optical axes of symmetry corresponds to the offset of the optical axis of the optical unit and the axis of symmetry of the reference geometry.

In this case, the coupling element is fixed to the optical module in the suitable position, for instance by adhesive bonding, friction welding or laser welding.

The solution according to one embodiment of the invention eliminates the alignment processes, as a result of which the cycle time with regard to high-volume production can be significantly reduced and the production costs can thus be considerably lowered.

By way of example, image recognition methods are used for establishing an offset between the optical axis of the optical element and the mechanical axis of the reference geometry. For this purpose, by way of example, the reference geometry and the current position of the optical unit are detected by means of a camera and the offset between the optical unit and the reference geometry is determined by means of a pattern recognition program.

The reference geometry, in one example, serves not only as a reference for the arrangement of the optical unit, but also for mechanically coupling and fixing the coupling element to the optical unit. Such fixing is possible in a simple manner since the axis of symmetry of the reference geometry and the axis of symmetry of the coupling element, which is defined by the external contour of the coupling element, are preferably the same after fixing. By contrast, the axis of symmetry of the hole of the coupling element is offset with respect thereto and matches the optical axis of the optical unit.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention is explained in more detail below on the basis of a plurality of exemplary embodiments with reference to the figures of the drawing, in which.

Figure 4A:
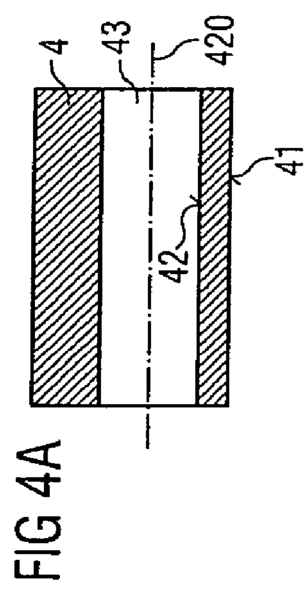
Figure 5A:
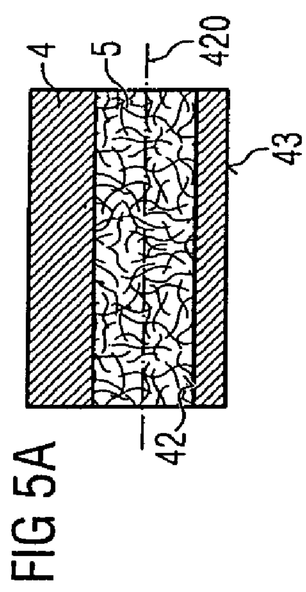
Figure 6A:
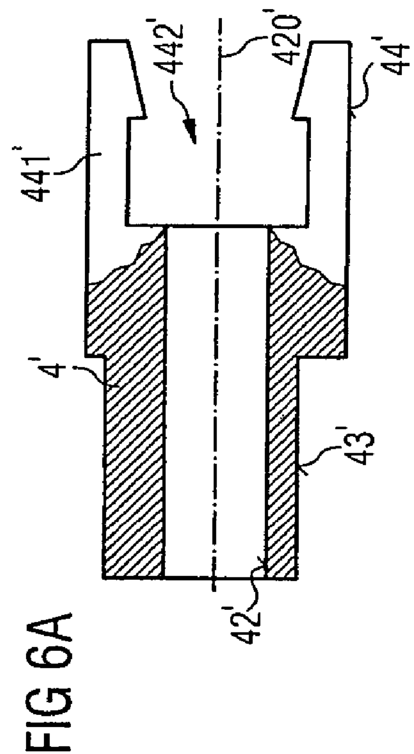
Figure 7:
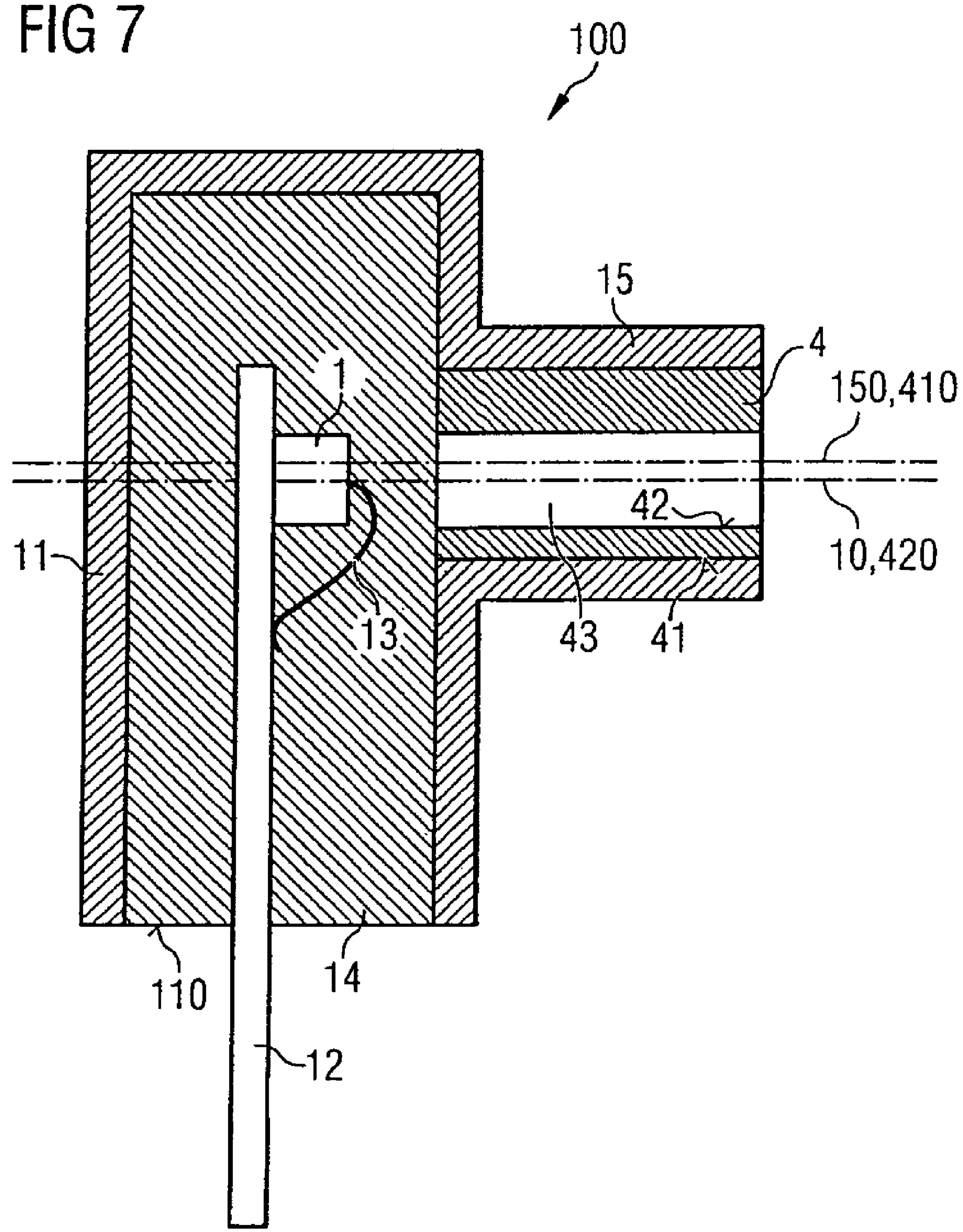

FIG. **4*a*** illustrates a first exemplary embodiment of a sleeve with an eccentric hole;

FIG. **4*b* illustrates a sleeve in accordance with FIG. 4*a*** with a non-eccentric hole for comparison;

FIG. **5*a*** illustrates a second exemplary embodiment of a sleeve with an eccentric hole;

FIG. **5*b* illustrates a sleeve in accordance with FIG. 5*a*** with a non-eccentric hole for comparison;

FIG. **6*a*** illustrates a third exemplary embodiment of a sleeve with an eccentric hole;

FIG. **6*b* illustrates a sleeve in accordance with FIG. 6*a* with a non-eccentric hole for comparison; and FIG. 7** illustrates an optoelectronic module with a transmitting or receiving component arranged on a lead frame according to another embodiment of the invention.

DETAILED DESCRIPTION OF THE INVENTION

Figure 1:
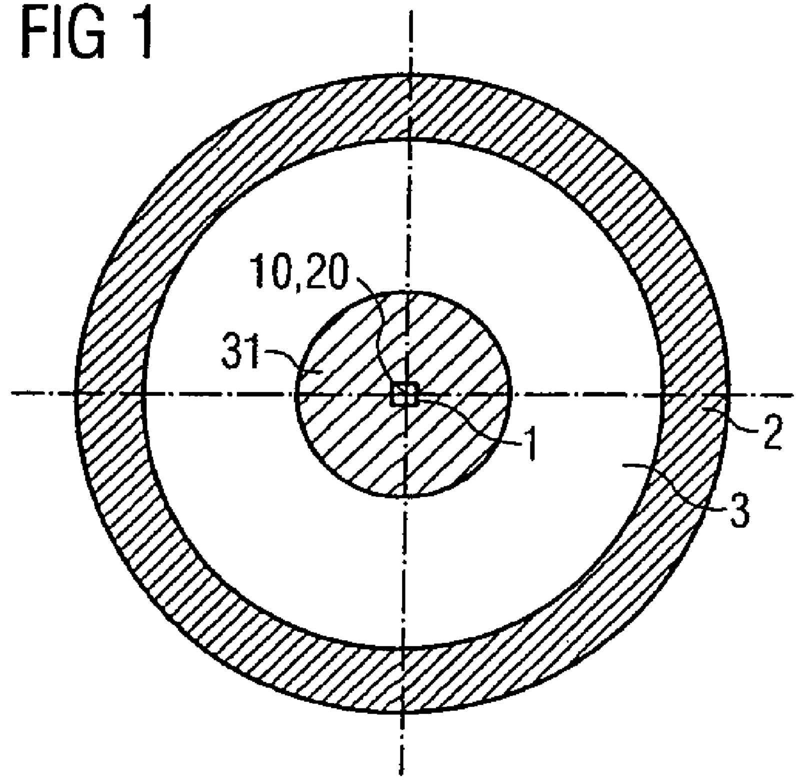
FIG. 1 illustrates an arrangement of an optical unit in an optical module having a reference geometry.

Firstly, the basic concept of the present invention is explained with reference to FIGS. 1 to 3. FIG. 1 shows a plan view of an optical unit 1 arranged on a reference area 3 of an optical module (not specifically illustrated). The optical module is in particular an optoelectronic transmitting module and/or an optoelectronic receiving module, for example an optoelectronic transceiver. The reference area 3 is for example the surface of a carrier substrate on which the optical unit 1 is mechanically fixed and electrically contact-connected in a manner known per se.

The optical unit 1 may be formed in any desired manner, in principle. A light emitting diode (LED), a vertically emitting laser diode (VCSEL), a photodiode, a mirror or some other optical functional area by means of which light is received or emitted is preferably involved. The optical unit is preferably formed as a prefabricated chip placed on the reference area 3. It is therefore also referred to as optical chip 1 hereinafter. The optical unit 1 has an optical axis 10 situated at the point of intersection of the system of coordinates illustrated by broken line in FIG. 1. Along the optical axis 10, light is emitted or light is received by the optical chip 1. The optical axis 10 runs perpendicular to the plane of the drawing of FIG. 1.

The reference structure having a reference geometry 2 is formed on the optical unit and serves, as will be explained, inter alia for coupling structures which serve for fixing an optical waveguide to the optical module and which enable a precise alignment of such an optical waveguide in relation to the optical chip 1.

The reference geometry 2 has a symmetrical form. In the illustrated exemplary embodiment, the reference geometry 2 is formed in cylindrical fashion, so that it is circular in the sectional illustration and in the front view. However, it should be pointed out at this juncture that other geometrical forms are also possible, for example an N-sided polygonal form. Moreover, the reference geometry need not have a continuous geometrical structure. It may equally comprise individual points or regions, for example 3 or 4 points, which are not connected to one another. It is of importance, however, that the reference geometry has an internal symmetry defining a first axis 20 of symmetry.

In FIG. 1, the axis 20 of symmetry of the reference structure 2 matches the optical axis 10 of the optical chip 1 since the optical chip 1 is arranged precisely in the center of the reference geometry. This is the ideal state, but the latter is only rarely achievable in practice. The optical chip 1 will generally be arranged within a region 31 of the reference area 3. Said region 31 specifies an offset region in which the optical axis 10 of the chip 1 does not match the geometrical axis 20 of the reference structure 2.

Figure 2:
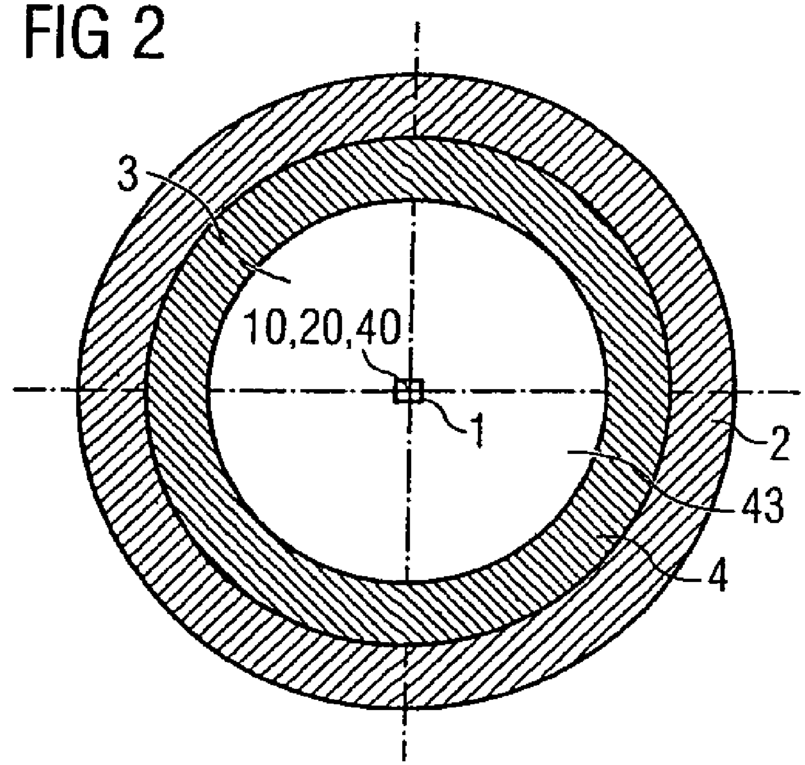
FIG. 2 illustrates the arrangement of an optical unit in an optical module having a reference geometry, with a sleeve having a central hole for coupling an optical waveguide thereto additionally provided.

FIG. 2 shows an arrangement in which an elongate sleeve 4 with an inner hole or cutout 43 is additionally arranged within the reference structure 2 of FIG. 1. The sleeve 4 is constructed symmetrically and the hole 43 is formed centrally in the sleeve 4. The sleeve 4 also has an axis 40 of symmetry, which, on account of the symmetrical arrangement of the sleeve 4 in the reference geometry 2, matches the axis 20 of symmetry of the reference geometry 2, on the one hand, and the optical axis 10 of the optical chip, on the other hand.

FIG. 2 also specifies the ideal, but not realistic, case where the optical chip 1 is positioned on the reference area 3 in such a way that the optical chip axis 10 lies precisely on the axis of symmetry 20 of the reference geometry of the reference geometry 2.

It should be noted, moreover, that the reference geometry 2 is formed by a cylindrical connector, for example, into which the cylindrical sleeve is inserted. In this case, the external diameter of the cylindrical sleeve 4 corresponds substantially to the internal diameter of the cylindrical connector 2, so that the sleeve can be inserted into the connector 2 essentially without any play. That end of the sleeve 4 which is remote from the optical chip 1 serves for receiving and coupling an optical waveguide, so that the sleeve provides an orientation between the optical chip 1 and an optical waveguide that is to be coupled thereto.

Figure 3:
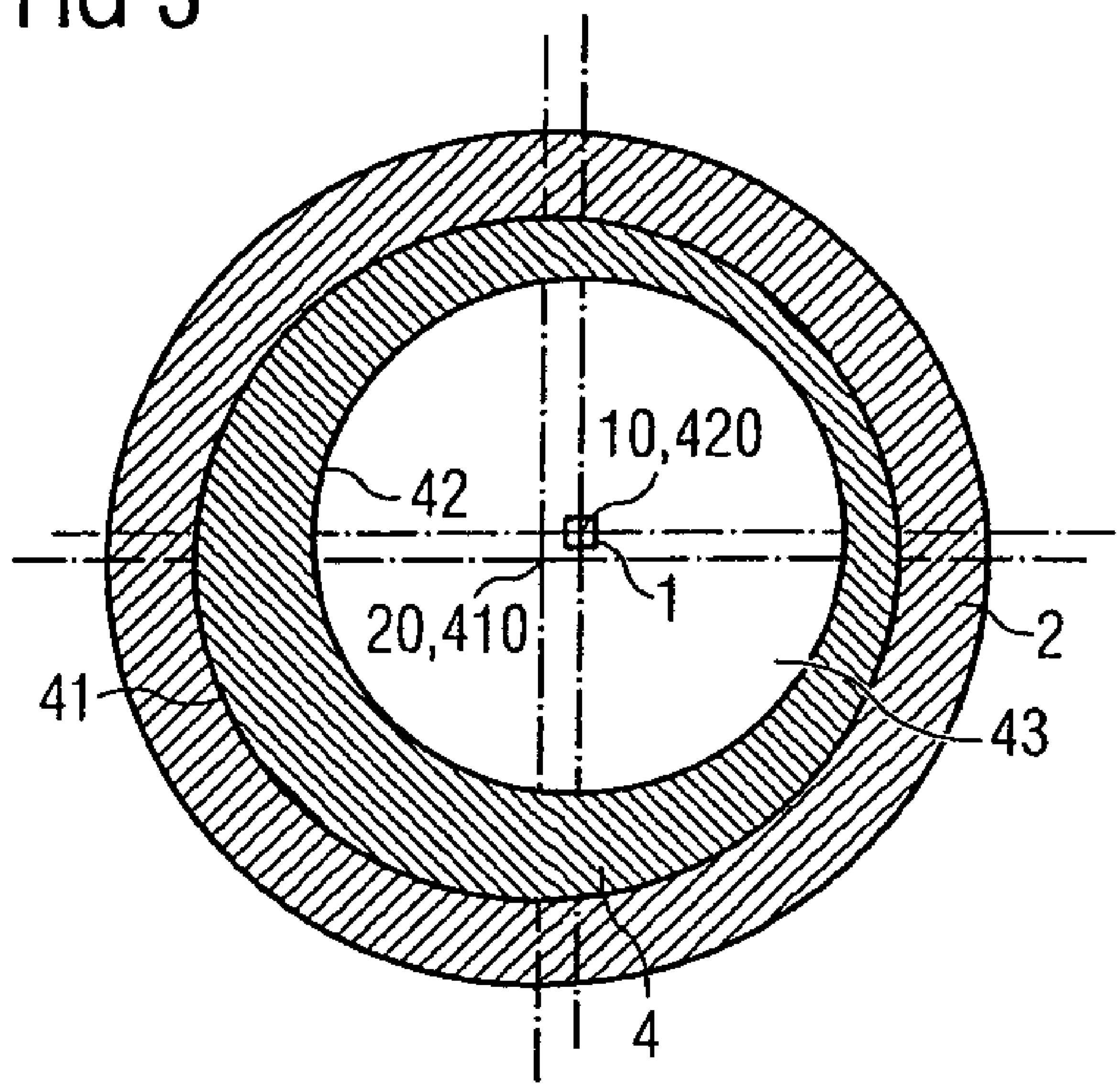
FIG. 3 illustrates the arrangement of an optical unit in an optical module having a reference geometry, with a sleeve having an eccentrically formed hole for coupling an optical waveguide thereto additionally provided.

FIG. 3 then shows the realistic case in practice where the optical chip 1 is mounted with an offset relative to the reference geometry 2 on the reference area of the optical unit. This means that the optical axis 10 of the optical chip 1 and the axis 20 of symmetry of the reference geometry 2 no longer coincide, but rather run parallel to one another with the presence of an offset.

A specially designed coupling structure in accordance with the present invention is provided then in order to compensate for this offset when coupling an optical waveguide thereto. For this purpose, a sleeve 4 having an eccentric hole or cutout 43 is provided. In this case, the wall of the sleeve 4 has an external contour 41 and an internal contour 42, which between them form a sleeve wall having a varying thickness. The internal contour 42 of the sleeve, i.e. the inner wall defining the cylindrical hole 43, has a first axis 420 of symmetry of the sleeve 4. In this case, the first axis of symmetry by its nature runs along the center or axis of the hole 43. By contrast, the external contour 41, i.e. the outer wall of the sleeve 4, defines a further axis 410 of symmetry. The two axes 420, 410 are offset with respect to one another.

It is immediately apparent that the axis 410 of symmetry of the outer wall of the sleeve 4 lies on the axis 20 of symmetry of the reference geometry 2. This is connected with the fact that the outer wall 41 runs symmetrically with respect to the reference geometry.

By contrast, the axis 420 of symmetry in relation to the inner wall 42 or the hole 43 is offset from the axis 20 of symmetry of the reference geometry. Provision is then made for choosing a sleeve 4 in the case of which the offset between the two axes 410, 420 of symmetry of the sleeve is essentially equal to the offset between the optical axis 10 of the optical chip 1 and the axis 20 of symmetry of the reference geometry 2, to be precise both with regard to magnitude and (after corresponding rotation of the sleeve) with regard to direction. What is thereby achieved is that the axis 420 of symmetry of the hole 43 matches the optical axis 10 of the optical chip. In this way, an optical fiber introduced into that end of the sleeve 4 which is remote from the optical chip 1 is automatically aligned and positioned relative to the optical chip 1, i.e. the power that is coupled in or out is therefore maximized, and such alignment is achieved without the need for active alignment.

The following method steps may be employed for orienting an optical fiber in relation to an optical unit 1.

After the optical chip 1 has been mounted on the reference area 3 of the optical module, the offset of the optical chip 1 or the optical axis 10 of the optical chip in relation to the axis 20 of symmetry of the reference geometry 2 provided on the optical module is determined. The location on the offset dome 31 (FIG. 1) at which the optical chip 1 has actually been positioned is thus established. Such a determination is preferably effected by means of an image recognition method. By way of example, the reference geometry and the optical chip are detected by means of a camera and their position is determined by means of a pattern recognition system. The pattern recognition system then determines the offset (deviation of the actual position from the desired position) of the optical chip 1 relative to the reference geometry 2. The offset is a vector having a specific length and a specific direction.

After the offset has been determined, a suitable sleeve 4 by means of which the offset can be compensated for is then selected from a constructional kit having a plurality of sleeves having eccentric holes that provide differing amounts of offset, respectively.

In this case, a sleeve 4 is selected in the case of which the distance between the two axes 410, 420 of symmetry explained in relation to FIG. 3 corresponds to the magnitude of the offset vector. The sleeve is fixed in relation to the reference geometry 2 on the optical module and rotated into a position in which the direction of the offset also matches. The end result is the situation illustrated in FIG. 3.

Figure 4B:
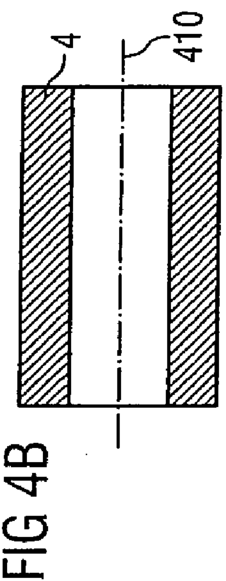
Figure 5B:
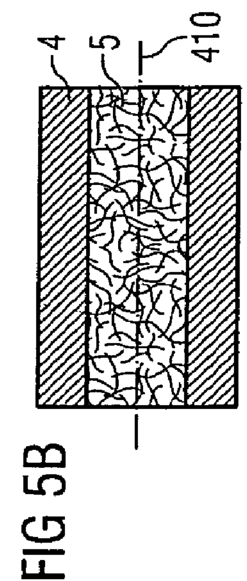
Figure 6B:
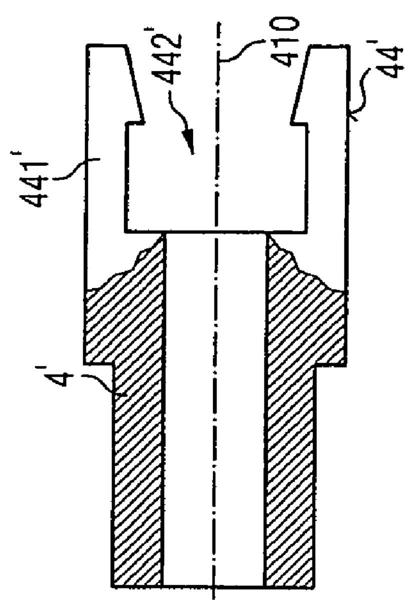

FIGS. 4*a*, 5*a* and 6*a* show a plurality of exemplary embodiments of sleeves 4, 4' as can be used in an arrangement in accordance with FIG. 3. The sleeves are illustrated in a lateral sectional view in this case. The respectively assigned FIGS. 4*b*, 5*b* and 6*b* show the corresponding sleeves with a symmetrical hole, i.e. without an eccentric hole 43.

FIG. 4*a* shows a sleeve 4 corresponding to the sleeve 4 of FIG. 3. A hole 43 with an axis 420 of symmetry is formed eccentrically in the sleeve 4. FIG. 4*b* shows a sleeve with a symmetrical hole and the axis 410 of symmetry with regard to the outer wall of the sleeve.

The sleeve 4 may comprise metal, ceramic or plastic. A fiber is inserted into the opening 43 of the sleeve 4 directly from one side for example via a plug interface (receptacle). Couplings of this type are known per se, and so they are not discussed any further.

In FIG. 5*a* the sleeve is formed in accordance with FIG. 4*a*. In this case, however, a so-called fiber stub 5 is fixed in the hole 43. Consequently, an optical waveguide section is fixedly integrated into the sleeve 4 and serves as a coupling element and is optically coupled to an optoelectronic transmitting and/or receiving component (chip 1), on the one hand, and to an optic fiber to be coupled, on the other hand. An optical fiber is coupled to one side of the fiber stub 5 in a manner known per se, for example by means of a surrounding housing in which the individual components are arranged. FIG. 5*b* shows a sleeve 4 with fiber stub 5 which has a symmetrical hole.

In accordance with the configuration of FIG. 6*a*, one end of a sleeve 4' forms a latching part 44' having latching structures 441' and a receiving opening 442' for coupling an optical plug. By inserting an optical plug into the opening 442' and corresponding latching, an optical plug can be connected to an optical fiber by means of a snap-action connection to the sleeve 4'. FIG. 6*b* in turn shows a sleeve 4' with a symmetrically formed cutout.

It is pointed out that the sleeve 4, 4', as illustrated in FIG. 3, is preferably fixed via the reference geometry 2 on the optical module. For this purpose, the sleeve 4 is fixed to the reference geometry by adhesive bonding, welding or some other permanent type of connection. The reference geometry thus serves for fixing the sleeve 4. Although this is advantageously the case, it is not necessarily the case. Thus, the reference geometry may also be used solely for determining an offset of the optical chip 1 and the sleeve 4 may also be fixed to the optical module by means of other fixing structures.

FIG. 7 shows an optical module 100 having a housing 11 filled with a transparent potting material 14, a leadframe 12 being inserted in said housing through a lower housing opening 110. An optical chip 1 is situated on the leadframe 12 and is electrically contact-connected by means of a bonding wire 13 and a further contact (not illustrated). The housing 11 furthermore forms, as reference geometry, a connector 15 serving for coupling an optical fiber thereto. The connector has an axis 150 of symmetry. The optical chip 1 has an optical axis 10 that would ideally match the axis 150 of symmetry of the connector. In reality and in the exemplary embodiment illustrated this is not the case, however, so that the axes 10, 150 are offset with respect to one another.

A sleeve 4 in accordance with FIGS. 3 and 4*a* is then inserted into the connector 15, said sleeve having an eccentric hole 43. In this case, the axis 420 of symmetry of the hole 43 lies on the optical axis 10 of the optical chip 1. By contrast, the axis 410 of symmetry of the outer wall 41 of the sleeve 4 lies on the axis 150 of symmetry of the coupling connector 15. The outer wall of the sleeve corresponds to the connector 15 and enables the sleeve 4 to be inserted into the coupling connector 15 without any problems. Since the axis 420 of symmetry of the hole 43 matches the optical axis 10 of the optical chip, an optical fiber can be fixed in an ideal coupling position (e.g., optimal optical coupling) on the sleeve 4 and the coupling connector 15. A lens (not illustrated) is preferably arranged between the optical chip 1 and the coupled optical fiber, in the manner as described for instance in DE 199 09 242 A1.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A method for orienting an optical waveguide in relation to an optical unit arranged in or on an optical module, the optical unit comprising an optical axis along which light is emitted or received by the optical unit, and the optical module comprising a reference geometry, which defines a first axis of symmetry, comprising:

providing a housing that generally defines the reference geometry, wherein the optical unit is enveloped in a transparent potting material within the housing; determining a magnitude and direction of an offset between the optical axis of the optical unit and the first axis of symmetry of the reference geometry; providing a coupling element which serves to receive an optical waveguide that is to be oriented in relation to the optical unit for coupling thereto, wherein the coupling element comprises a hole defined by an internal contour thereof, the internal contour defining a second axis of symmetry, wherein the coupling element further comprises an external contour that defines a third axis of symmetry, and wherein the coupling element is selected from a plurality of coupling elements that each have differing offsets between their respective second axis of symmetry and third axis of symmetry, such that the offset between the second axis of symmetry and third axis of symmetry of the coupling element is essentially equal to the offset between the first axis of symmetry and the optical axis of the optical unit; arranging the coupling element in relation to the reference geometry of the optical module such that the second axis of symmetry coincides with the optical axis of the optical unit, wherein the first axis of symmetry and the second axis of symmetry run generally parallel to one another and have an offset with respect to one another that corresponds to an offset between the optical axis of the optical unit and the first axis of symmetry of the reference geometry, wherein the third axis of symmetry lies on the first axis of symmetry; and fixing the provided coupling element to the optical module, wherein the offset between the second and third axes of symmetry is essentially equal to the offset between the first axis of symmetry and the optical axis.

2. The method of claim 1, wherein the internal contour of the coupling element is eccentric with respect to the external contour thereof.

3. The method of claim 1, further comprising fixing the coupling element to the optical module by means of the reference geometry.

4. The method of claim 1, wherein determining the offset between the optical axis of the optical element and the first axis of symmetry of the reference geometry is performed by means of an image recognition method.

5. The method of claim 1, wherein the coupling element comprises a longitudinally extending cylindncal sleeve having a first end coupled to the optical module, and a second end configured to couple to an optical waveguide.

6. An optical module, comprising:

an optical unit comprising an optical axis along which light is emitted therefrom or received thereto; a reference geometry structure associated with the optical unit and defining a first axis of symmetry, wherein the optical axis of the optical unit and the first axis of symmetry of the reference geometry structure run generally parallel to one another and have an offset with respect to one another, and wherein the optical unit is generally encapsulated within the reference geometry structure via a transparent potting material; and an integrally formed coupling element associated with the optical unit and the reference geometry structure, wherein the coupling unit is configured to receive or couple an optical waveguide to the optical unit, wherein the coupling element comprises a hole extending therethrough defined by an internal contour thereof, wherein the internal contour of the coupling element defines a second axis of symmetry, wherein the coupling element is arranged with respect to the optical module such that the second axis of symmetry coincides with the optical axis of the optical unit, and wherein the first axis of symmetry and the second axis of symmetry run generally parallel to one another and have an offset with respect to one another that corresponds to the offset between the optical axis of the optical unit and the first axis of symmetry of the reference geometry structure.

7. The module of claim 6, wherein the coupling element further comprises an external contour defining a third axis of symmetry, which is offset from the second axis of symmetry, and wherein the coupling element is arranged in relation to the optical module such that the third axis of symmetry lies on the first axis of symmetry of the reference geometry structure.

8. The module of claim 6, wherein the coupling element comprises a sleeve with an eccentric hole extending therethrough defining the internal contour thereof.

9. The module of claim 8, wherein the sleeve is fixed to the optical module by means of the reference geometry structure.

10. The module of claim 6, wherein the optical unit comprises a light-emitting diode, a laser diode, a photodiode, or a mirror.

11. The module of claim 6, wherein the optical unit comprises an optical chip.

12. The module of claim 6, wherein the coupling element comprises, on a side remote from the optical unit, a latching structure configured to couple to an optical waveguide.

13. The module of claim 6, wherein the reference geometry structure comprises cross-sectionally a circle or an N-sided polygon.

14. An optical module constructional kit,comprising:

an optical unit having an optical axis and a reference geometry structure associated with the optical unit and having a first axis of symmetry associated therewith, wherein the optical unit is potted within the reference geometry structure via a transparent potting material; and a plurality of integrally formed coupling elements, wherein each coupling element comprises a hole extending therethrough defined by an internal contour thereof that defines a second axis of symmetry, and an external contour that defines a third axis of symmetry, wherein the first and second axes run generally parallel to one another, and wherein an offset magnitude between the second and third axes of symmetry for each coupling element is different.

15. The constructional kit of claim 14, wherein the coupling elements each comprise a sleeve, wherein the hole defined by the internal contour is eccentric with respect to the external contour thereof, respectively.

16. The constructional kit of claim 15, wherein each sleeve comprises a longitudinally extending cylindrical sleeve, and wherein a first end of each sleeve is configured to couple to the reference geometry structure, and a second end of each sleeve is configured to couple to an optical waveguide.

17. The method of claim 1, wherein the housing comprises a generally hollow connector extending therefrom, wherein the generally hollow connector generally defines the reference geometry, and wherein the coupling element comprises a sleeve, wherein arranging the coupling element in relation to the reference geometry comprises inserting the sleeve into the generally hollow connector.

* * * * *